United States Patent
Chen et al.

(10) Patent No.: US 8,412,883 B2
(45) Date of Patent: Apr. 2, 2013

(54) MEMORY CONTROLLER AND ASSOCIATED CONTROL METHOD

(75) Inventors: Yo-Lin Chen, Hsinchu Hsien (TW); Hsian-Feng Liu, Hsinchu Hsien (TW); Ming-Chieh Yeh, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 294 days.

(21) Appl. No.: 12/976,815

(22) Filed: Dec. 22, 2010

(65) Prior Publication Data
US 2011/0153963 A1   Jun. 23, 2011

(30) Foreign Application Priority Data
Dec. 23, 2009   (TW) ................................ 98144508 A

(51) Int. Cl.
*G06F 12/00* (2006.01)
(52) U.S. Cl. .......................................................... 711/110
(58) Field of Classification Search .................. None
See application file for complete search history.

(56) References Cited

U.S. PATENT DOCUMENTS

| | | | | |
|---|---|---|---|---|
| 6,078,980 A | * | 6/2000 | Holland et al. ................ | 713/400 |
| 6,381,659 B2 | * | 4/2002 | Proch et al. ..................... | 710/57 |
| 6,389,489 B1 | * | 5/2002 | Stone et al. ..................... | 710/57 |
| 6,538,476 B2 | * | 3/2003 | Forbes ............................. | 327/57 |
| 2005/0122815 A1 | * | 6/2005 | Momtaz et al. ................. | 365/221 |

* cited by examiner

*Primary Examiner* — Hiep Nguyen
(74) *Attorney, Agent, or Firm* — Han IP Law PLLC

(57) ABSTRACT

A memory controller and an associated controlling method are provided. The memory controller is connected to a memory module, and includes a FIFO buffer for receiving valid data outputted from the memory module, a write pointer for indicating written data stored in the FIFO buffer, and a read pointer for indicating read data stored in the FIFO buffer. According to the controlling method, during a CAS latency of the memory module after a read command is generated, the value of the write pointer is controlled to have the same value as that of the read pointer.

16 Claims, 8 Drawing Sheets

MEMORY CONTROLLER AND ASSOCIATED CONTROL METHOD

CROSS REFERENCE TO RELATED PATENT APPLICATIONS

This patent application claims priority from Taiwan Patent Application No. 098144508, filed in the Taiwan Patent Office on Dec. 23, 2009, entitled "Memory Controller and Associated Control Method", and incorporates the Taiwan patent application in its entirety by reference.

TECHNICAL FIELD

The present disclosure relates to a memory controller and associated control method, and more particularly, to a method for controlling a pointer of a first in first out buffer of a memory controller.

BACKGROUND OF THE PRESENT DISCLOSURE

A memory controller, generally connected to a memory module, writes data into or read data from the memory module. A currently prevailing memory module is a double-data-rate (DDR) module.

When a memory controller sends a write command, data is transmitted to a memory module to be stored therein. When the memory controller sends a read command, data is read from the memory module and transmitted to the memory controller for subsequent processing.

FIG. 1 shows a schematic diagram of signal connections between a memory controller and a memory module. Signals between a memory controller 100 and a DDR memory module 200 at least include: an external clock signal CLKext, address signals, command signals, data serial signals DQ0 to DQ7, and a data strobe signal DQS. The command signals include a write enable signal WE; the address signals include memory address signals A0 to A13, a row address strobe signal RAS, a column address strobe signal CAS.

Further, a DDR transaction comprises steps below. The memory controller 100 first sends out command and address signals, and the DDR memory module 200 acquires a command, e.g., a write command or a read command, according to the command signal. The DDR memory module 200 then prepares to store or output data.

In response to a write command, the data serial signals DQ0 to DQ7 along with the data strobe signal DQS are generated by the memory controller 200. The DDR memory module 200 then latches data carried by the data serial signals DQ0 to DQ7 according to the data strobe signal DQS generated by the memory controller 100, and writes the data into corresponding memory address in the DDR memory module 200.

A period from the memory module 200 receives the write command till the data is ready for output is referred to as CAS latency CL, which is known to the memory controller 100 at a startup test and is generally two external clock CLKext cycles (CL=2). That is, when the command is a write command, the DDR memory module 200 drives the data serial signals DQ0 to DQ7 after the CAS latency CL. At this point, the memory controller 100 latches the data serial signals DQ0 to DQ7 according to the data strobe signal DQS, and acquires data of corresponding memory addresses.

FIG. 2 shows a timing diagram of signals for a write command. When the DDR memory module 200 outputs data, the data strobe signal DQS and the data serial signals DQ0 to DQ7 are generated, and a frequency of the data strobe signal DQS is the same as that of the external clock CLKext. In contrast, before the DDR memory module 200 outputs data, the data strobe signal DQS is tri-stated at high impedance.

As shown in FIG. 2, at a time T0, address A0 to A13 and the read command are acquired from the address signal and the command signal, while no operation (NOP) is observed at other times. Since the CAS latency CL equals two external clock CLKext cycles (CL=2), the data strobe signal DQS becomes low-level from tri-state at a time T1, and switches between high-level and low-level between T2 and T4 to again become tri-state after T4. Further, after a period of a CAS latency CL that equals two external clock CLKext cycles (CL=2), the data serial signals DQ0 to DQ7 in sequence generate data D0, D1, D2 and D3 during T2 to T4. Therefore, the memory controller 100 is able to latch the data D0, D1, D2 and D3 of the data serial signals DQ0 to DQ7 according to rising and falling edges of the data strobe signal DQS. In general, the memory controller 100 is able to latch the data serial signals DQ0 to DQ7 after delaying a phase of the data strobe signal DQS by 90 degrees.

FIG. 3 shows a schematic diagram of a conventional memory controller. The memory controller 100 comprises a clock generator 102, a command generator 104, a write pointer 106, a read pointer 108, a first-in-first-out (FIFO) buffer 110 and a processing circuit 112.

An internal clock CLKin of the memory controller 100 has a same frequency as that of the external clock CLKext, however with a different phase. In other words, the phase of the data serial signals DQ0 to DQ7 outputted by the DDR memory module is different from that of the internal clock CLKin, meaning that the data serial signals DQ0 to DQ7 and the internal clock CLKin are non-synchronous.

To overcome the issue of the non-synchronous data internal and external data of the memory controller 100, the memory controller 100 is built-in with a FIFO buffer 110. The data of the data serial signals DQ0 to DQ7 is written into the FIFO buffer 110 according to the data strobe signal DQS, and the processing circuit 112 in the memory controller 100 reads the data in the FIFO buffer 110 according to the internal clock CLKin.

As shown in FIG. 3, the command generator 104 generates the address signals and the command signal according to the external clock CLKext, and the DDR memory module 200 writes data into the FIFO buffer 110 according to the data serial signals DQ0 to DQ7 and the data strobe signal DQS. The processing circuit 112 then generates a read signal Fetch according to the internal clock CLKin to the FIFO buffer 110, and reads in sequence the data Data from the FIFO buffer 110.

To effectively manage the FIFO buffer 110, the memory controller 100 further comprises a write pointer 106 and a read pointer 108, which are regarded as a counter. Each time the DDR memory module 200 writes data, a write count maintained by the write pointer 106 is incremented by one; similarly, each time the processing circuit 112 reads data, a read count maintained by the read pointer 108 is also incremented by one. That is, the write pointer 106 counts the number of data being written/stored into the FIFO buffer 110 according to the data strobe signal DQS, and the read pointer 108 counts the number of data being read from the FIFO buffer 110 according to the read signal Fetch.

FIGS. 4A to 4F show schematic diagrams of operations of a FIFO buffer. In the description below, the timing diagram in FIG. 3 is used as an example, and suppose that the FIFO buffer 110 has four layers, i.e., #00, #01, #10 and #11, each of which for storing data. Further, the write pointer 106 and the read pointer 108 are both binary counters, with respective write count and read count being "11" at beginning.

Referring to FIG. 4A, at the time T2 at a rising edge of the data strobe signal DQS, the data D0 is written into the 00 layer of the FIFO buffer 110. At this point, a write pointer 106 increments by one so that the write count Wptr becomes "00" to indicate the presence of valid data temporarily stored therein, whereas the read count Rptr of a read pointer 108 remains at "11" to indicate that no data is yet read. Referring to FIG. 4B, at a time T2' at a falling edge of the data strobe signal DQS, the data D1 is written into the 01 layer of the FIFO buffer 01. At this point, the write pointer 106 increments by one so that the write count Wptr becomes "01" to indicate the presence of valid data temporarily stored therein, whereas the read count Rptr of a read pointer 108 remains at "11" to indicate that no data is yet read.

When a difference between the write count Wptr of the write pointer 106 and the read count Rptr of the read pointer 108 exceeds a predetermined value, e.g., 2, the processing circuit 112 begins to read the data in the FIFO buffer 110. Therefore, as shown in FIG. 4C, at the time T3 at a rising edge of the data strobe signal DQS, the data D2 is written into the 10 layer of the FIFO buffer 110. At this point, the write pointer 106 increments by one so that the write count Wptr becomes "10" to indicate the presence of valid data stored therein, while the data D0 is read to increment the read pointer 108 by one so that the read count Rptr becomes "00" to indicate that the data D0 is currently invalid data. Referring to FIG. 4D, at a time T3' at a falling edge of the data strobe signal DQS, the data D3 is written into the 11 layer of the FIFO buffer 110. At this point, the write pointer 106 increments by one so that the write count Wptr becomes "11" to indicate the presence of valid data stored therein, while the data D1 is read to increment the read pointer 108 by one so that the read count Rptr becomes "01" to indicate that the data D1 is currently invalid data.

After the time T4, no more data is inputted into the FIFO buffer 110, and the data strobe data DQS stays inactive such that the write count Wptr of the write pointer 106 stays at "11". Meanwhile, the processing circuit 112 continues to read the data in the FIFO buffer 110. Referring to FIG. 4E, when the data D2 is read, the read pointer 108 increments by one so that the read count Rptr becomes "10" to indicate that the data D2 is regarded as invalid data. Referring to FIG. 4F, when the data D3 is read, the read pointer 108 increments by one so that the read count Rptr becomes "11" to indicate that the data D3 is regarded as invalid data.

When the memory controller 100 again generates a read command, the read pointer 108 and the write pointer 106 operate similarly to the operations described above. Thus, the FIFO buffer 110 serves as a ring buffer, the write count Wptr of the write pointer 106 indicates a position of valid data which is just written into the FIFO buffer 110, and the read count Rptr of the read counter 108 indicates a position of invalid data which is just read out the FIFO buffer 110.

It is to be noted that, that memory controller 100 and the DDR memory module 200 are welded onto a circuit board (not shown), and signal connections thereof are achieved by layout traces on the circuit board. Inevitably, noises on the circuit board are resulted.

More specifically, when the memory controller 100 is not reading data and the data strobe signal DQS is at tri-state, an event that the data strobe signal DQS is interfered by noises to cause glitch shall result in the write pointer 106 incrementing by one, when in fact that no valid data is written into the FIFO buffer 110. Consequently, erroneous data is received by the processing circuit 112 to even lead to a severe system crash.

SUMMARY OF THE PRESENT DISCLOSURE

Therefore, the present disclosure provides a memory controller and associated control method that updates a correct count to a write pointer through a counter calibration unit before writing valid data into a FIFO buffer.

According to the present disclosure, a memory controller coupled to a memory module comprises: a clock generator, for generating an internal clock to a processing circuit and generating an external clock to the memory module; a command generator, for generating a read command to the memory module according to the external clock; a FIFO buffer, writing data of a data serial signal generated by the memory module into the FIFO buffer according to a data strobe signal after the command generator generates the read command; a processing circuit, operating according to the internal clock, for reading data in the FIFO buffer; a write pointer, for counting according to the data strobe signal, having a count that is associated with a position of written data in the FIFO buffer; a read pointer, for counting according to a number of the processing circuit reading from the data of the FIFO buffer, having a count that is associated with a position of read data in the FIFO buffer; and a pointer calibration unit, connected to the command generator, for synchronizing the count of the write pointer and the count of the read pointer after the read command is generated and before the memory module outputs data.

According to the present disclosure, a method for controlling a memory controller connected to a memory module is provided. In the method, a FIFO buffer is used to receive data outputted from the memory module, a write pointer is used to indicate a position of written data in the FIFO buffer, and a read pointer is used to indicate a position of read data in the FIFO buffer. Further, within a CAS latency after the memory controller generates a read command, a count of the write pointer is set to be the same as a count of the read pointer.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF THE PREFERRED EMBODIMENT

According to an embodiment of the present disclosure, a pointer calibration unit is provided in a memory controller, and a correct count is updated to a write pointer using the pointer calibration unit before a DDR memory module outputs valid data to a FIFO buffer.

Figure 1:
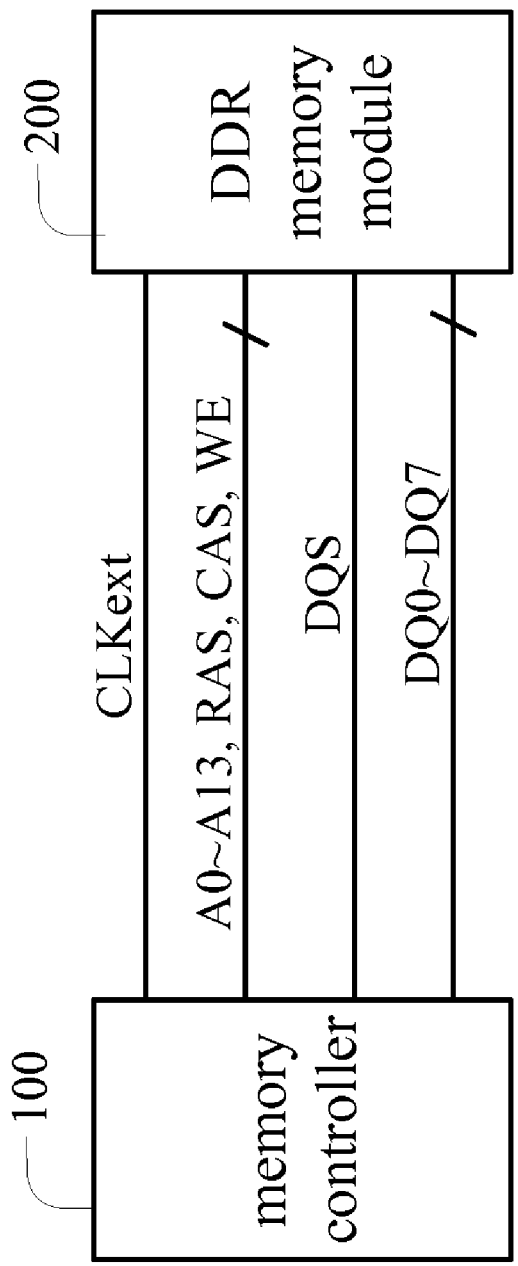
FIG. 1 is a schematic diagram of signal connections between a memory controller and a memory module.
Figure 2:
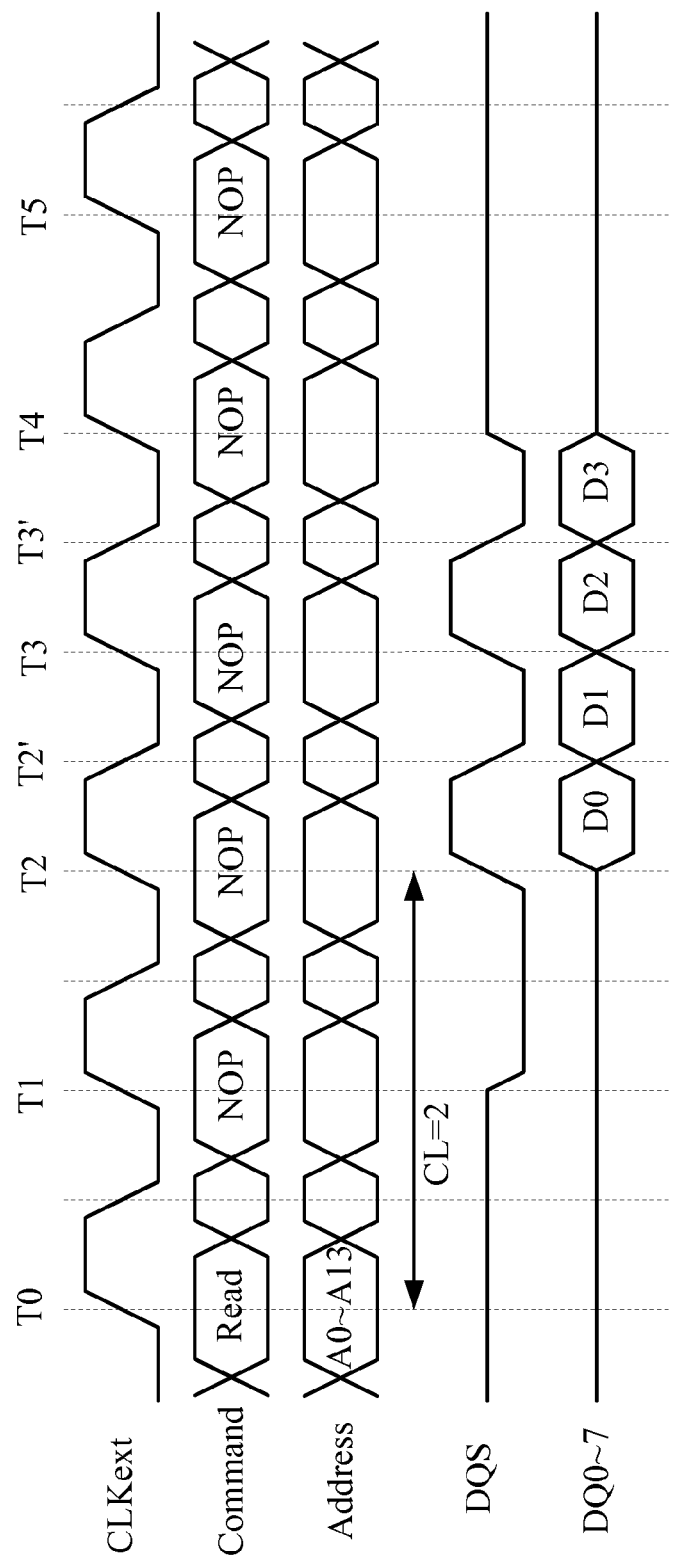
FIG. 2 is a timing diagram of signals for a read command.
Figure 3:
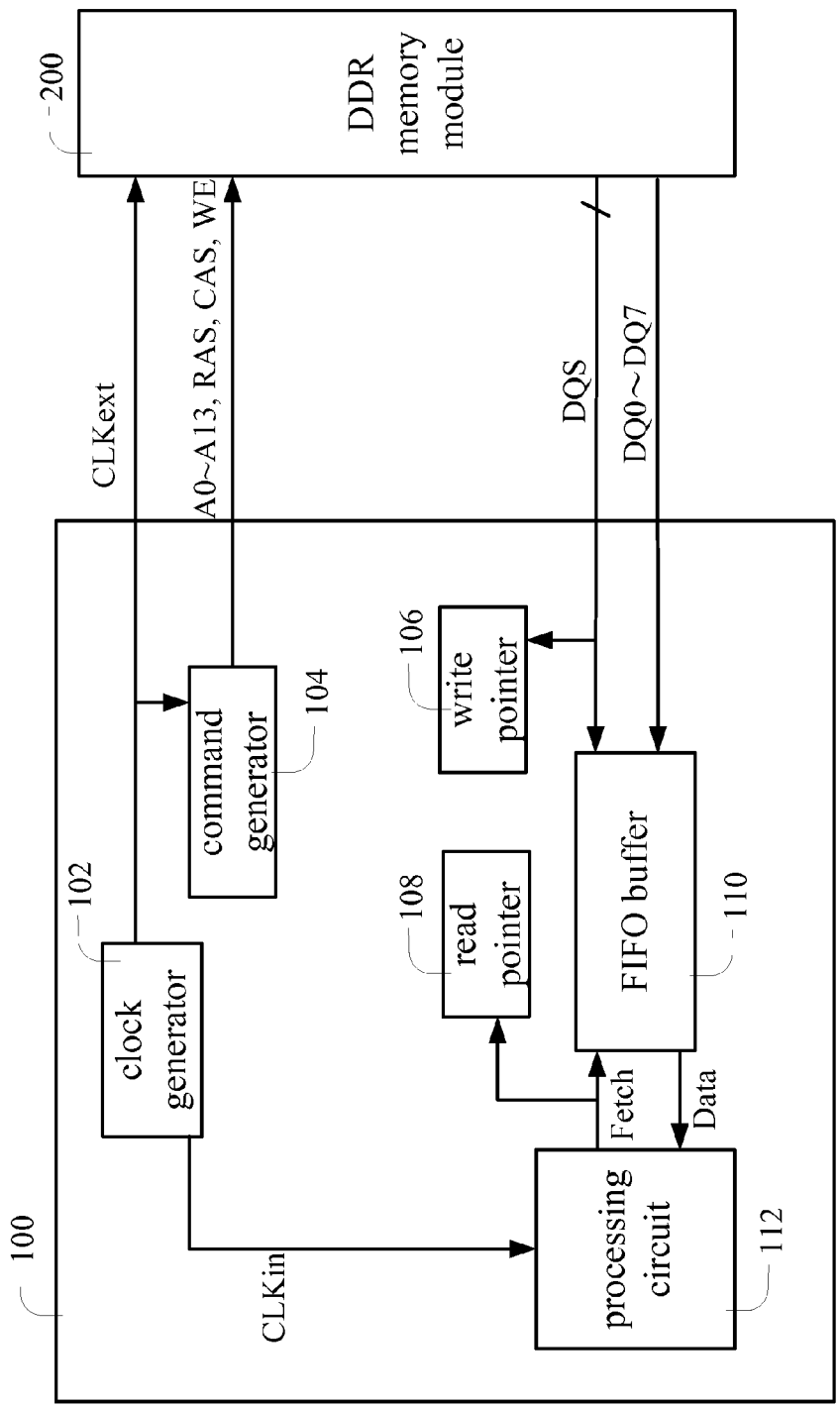
FIG. 3 is a schematic diagram of a conventional memory controller.
Figure 4A:
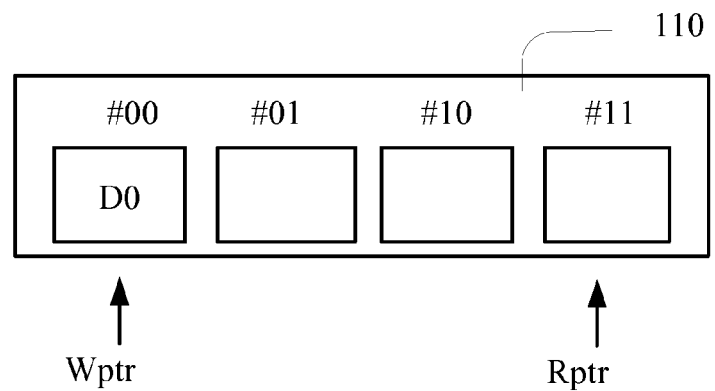
FIGS. 4A to 4F are schematic diagrams of operations of a FIFO buffer.
Figure 4B:
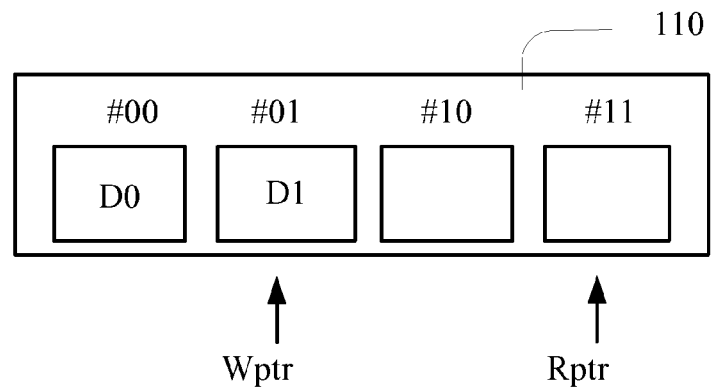
Figure 4C:
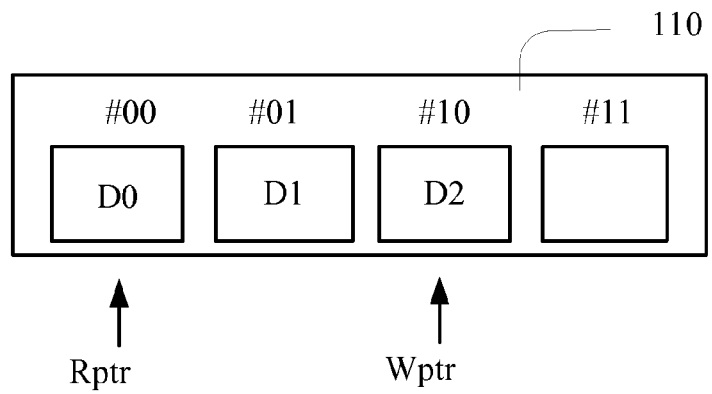
Figure 4D:
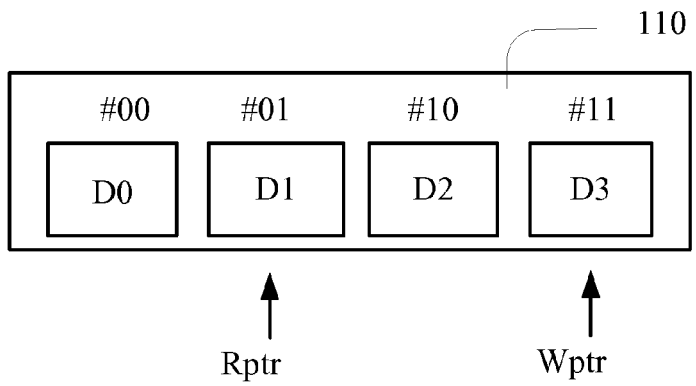
Figure 4E:
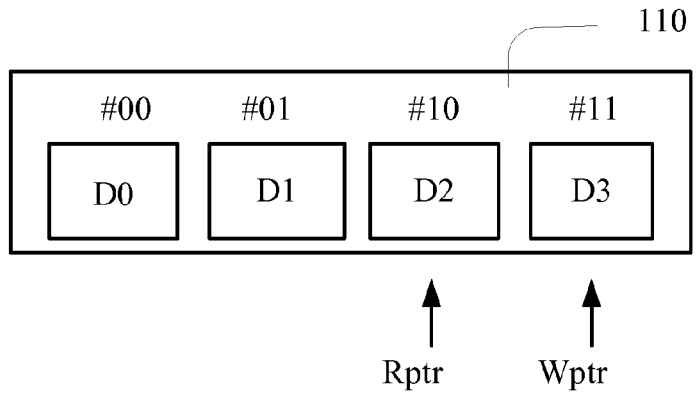
Figure 4F:
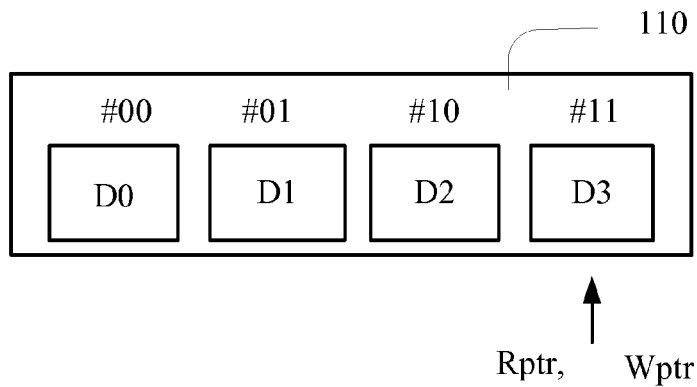
Figure 5:
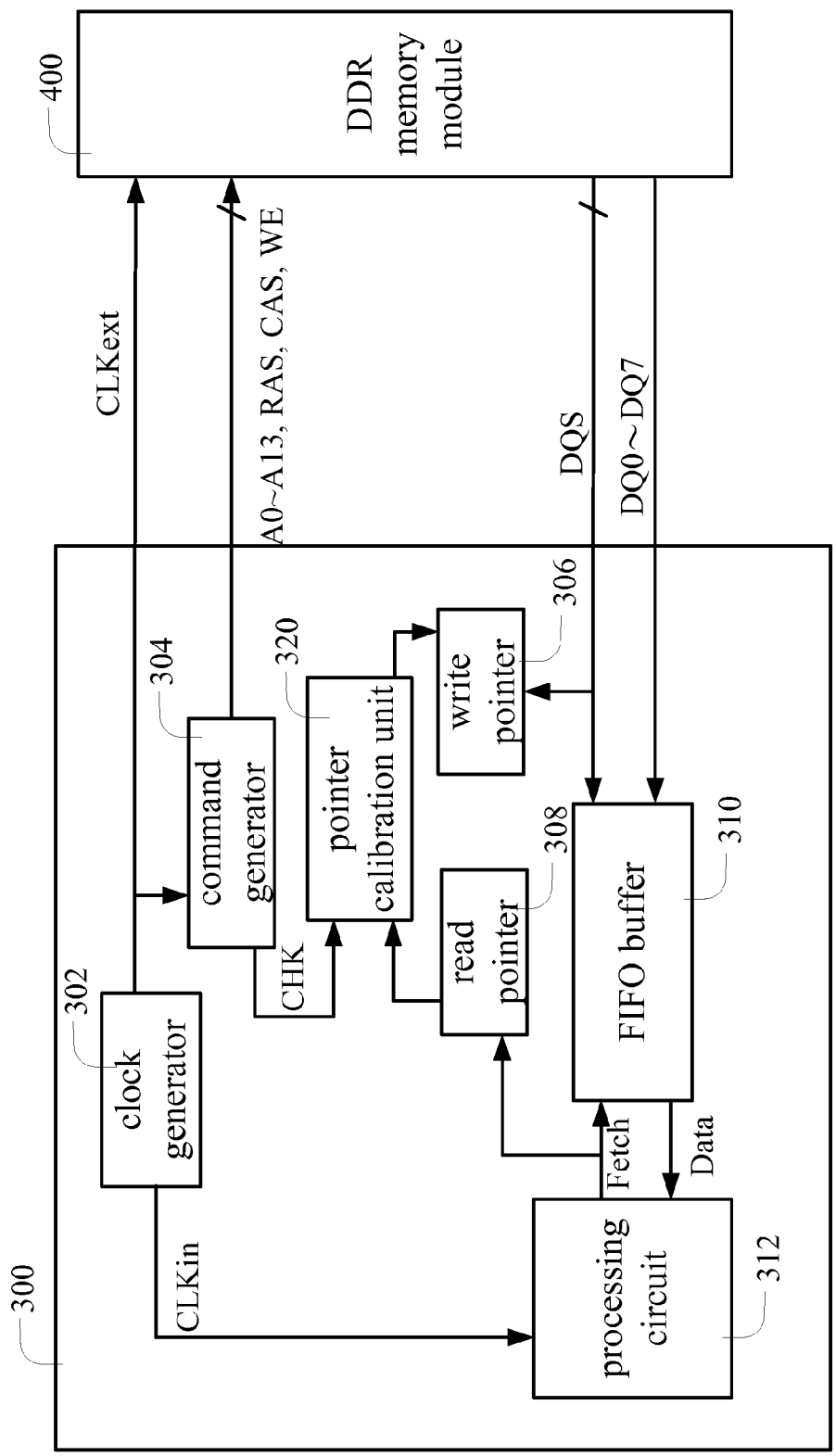
FIG. 5 is a schematic diagram of a memory controller according to an embodiment of the disclosure.

FIG. 5 shows a schematic diagram of a memory controller according to an embodiment of the present disclosure. A memory controller 300 comprises a clock generator 302, a command generator 304, a write pointer 306, a read pointer 308, a FIFO buffer 310, a processing circuit 312, and a pointer calibration unit 320.

The clock generator 302 generates an internal clock CLKin to the processing circuit 312 and an external clock CLKext to the DDR memory module 400. The command generator 304 generates a read command to the DDR memory module 400 according to the external clock CLKext. The FIFO buffer 310 receives data of data serial signals DQ0 to DQ7 generated by the DDR memory module 400 according to a data strobe signal DQS of the DDR memory module 400. The processing circuit 312 operates according to the internal clock CLKin for reading data in the FIFO buffer 310. The write pointer 306 counts the number of times data is written/stored into the FIFO buffer 310 according to the data strobe signal DQS to generate a write count that indicates a position of written data in the FIFO buffer. The read pointer 308 counts the number of times data is read from the FIFO buffer 310 according to the read signal Fetch to generate a read count that indicates a position of read data in the FIFO buffer.

In this embodiment, the information of the CAS latency CL of the DDR memory module 400 is provided to the memory controller 300 in advance. The command generator 304 generates a correcting signal CHK to the pointer calibration unit 320 upon generating a read command. The pointer calibration unit 320, connected to the command generator 304, synchronizes the write count of the write pointer 306 and the read count of the read pointer 308 after the read command is generated and before the DDR memory module 400 outputs data according to the correcting signal CHK and the information of the CAS latency CL.

From the description of the prior art, it is known that the write count of the write pointer 306 equals to the read count of the read pointer 308 after the processing circuit 312 reads the last section of previously stored data. Therefore, after a next read command is generated to before valid data is written into the FIFO buffer 310, the write count of the write pointer 306 and the read count of the read pointer 308 need to be kept at a same value as well. According to the present disclosure, the pointer calibration unit 320 utilizes the foregoing characteristic to calibrate the write count of the writer pointer 306, that is, the read count of the read pointer 308 is adopted to update the write count of the write pointer 306. Thus, it is ensured that before a period that valid data is generated by the DDR module 400 and valid data is written into the FIFO buffer 310, the write count of the write pointer 306 and the read count of the read counter 308 are set to the same value.

Taking a CAS latency CL equaling to two external clock CLKext cycles for example, i.e., CL=2, within two external clock CLKext cycles during which the command generator 304 generates the read command, the read count of the read pointer 308 stays unaffected even if the write count of the write pointer 306 is changed due to glitches caused by noise interferences on the data strobe signal DQS. Therefore, before valid data is written into the FIFO buffer 310, the pointer calibration unit 320 first updates the correct read count to the write count of the write pointer 306.

When the memory module 400 then starts to generate the data strobe signal DQS and data serial signals DQ0 to DQ7 and write valid data into the FIFO buffer 310, it is ensured that the value of the write count of the write pointer 306 is correct, so that the write counter continues counting according to the data strobe signal DQS to further ensure that the processing circuit 312 does not receive any erroneous data that may cause inappropriate operations.

Therefore, in the foregoing embodiment according to the present disclosure, the pointer calibration unit 304 updates the read count of the read pointer 308 to the write pointer 306 after the command data is generated and before valid data is written into the FIFO buffer 310 by utilized the information of the CAS latency CL of the DDR memory module 400 and the correcting signal CHK.

Figure 6:
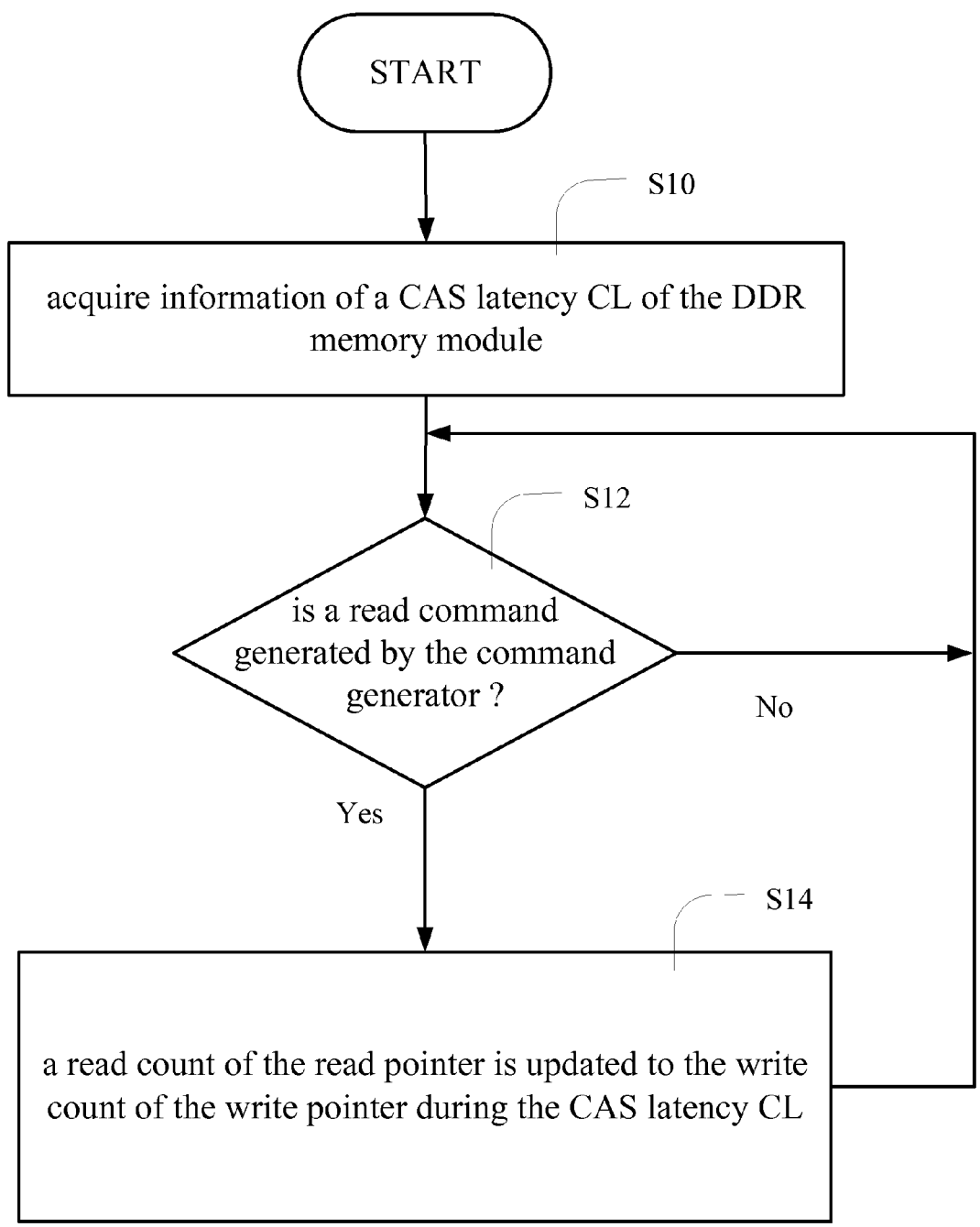
FIG. 6 is a flowchart of a control method according to another embodiment of the invention.

FIG. 6 shows a flowchart of a method for controlling a memory controller according to another embodiment of the present disclosure. In Step S10, information of a CAS latency CL of the DDR memory module 400 is acquired at startup of the memory controller 300. In Step S12, determining whether a read command is generated by the command generator 304 is performed. In Step S14, a read count of the read pointer 308 is updated to the write count of the write pointer 306 during the CAS latency CL. In contrast, when the read command is not generated by the command generator 304, the method is stays at Step 12 until the command generator 304 sends out a read command. Further, a next read command is awaited for after the write count of the write counter 306 is updated.

Accordingly, after the CAS latency CL, when the memory module 400 then starts to generate the data strobe signal DQS and data serial signals DQ0 to DQ7 and write valid data into the FIFO buffer 310, it is ensured that the value of the write count of the write pointer 306 is correct, so that the write counter continues counting according to the data strobe signal DQS to further ensure that the processing circuit 312 does not receive any erroneous data that may cause inappropriate operations.

Figure 7:
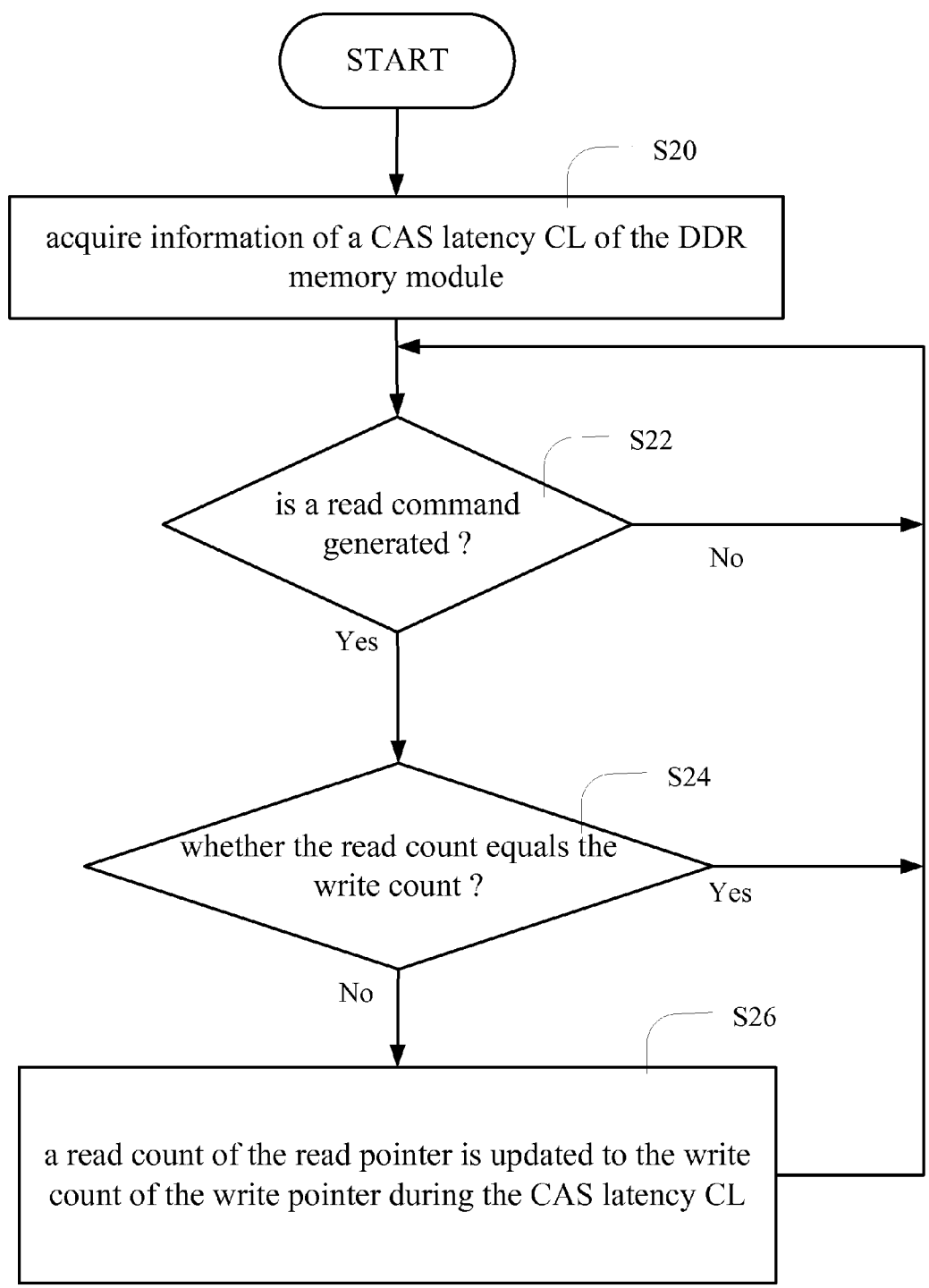
FIG. 7 is a flowchart of a control method according to yet another embodiment of the invention.

To a person skilled in the art, other approaches may also be adopted to accomplish same effects. FIG. 7 shows a flowchart of a method for controlling a memory controller according to yet another embodiment of the present disclosure. In Step S20, information of a CAS latency CL of the DDR memory module 400 is acquired at startup of the memory controller 300. In Step S22, a read command is generated by the command generator 304. In Step S24, it is determined whether the read count of the read pointer 308 equals the write count of the write pointer 306. In contrast, when the read command is not generated by the command generator 304, the method is stays at Step S22 until the command generator 304 sends out a read command. In Step S26, when it is determined that the read count of the read pointer 308 is different from the write count of the write pointer 306, the read count of the read pointer 308 is updated to the write count of the write pointer 306 during the CAS latency CL. When it is determined that the read count of the read pointer 308 equals the write count of the write pointer 306, the write pointer 306 need not be updated and a next read command is awaited for.

More specifically, after the read command is generated and before valid data is written into the FIFO buffer 310, the pointer calibration unit 304 compares the write count of the write pointer 306 and the read count of the read pointer 308. When the write count is the same as the read count, the pointer calibration unit 304 does not update the write pointer 306; in contrast, when the write count differs from the read count, the pointer calibration unit 304 utilizes the correct read count to update the write count of the write pointer 306.

With description of the embodiments, the present disclosure provides a memory controller and associated control method that updates a correct read count to a write count of a write pointer using a pointer calibration unit before valid data is written into a FIFO buffer, so as to prevent a subsequent processing circuit from reading invalid data that may lead to a system crash.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A memory controller, coupled to a memory module, comprising:
    a command generator that generates a read command and provides the read command to the memory module;
    a first-in-first-out (FIFO) buffer that stores data received from the memory module according to a data strobe signal generated by the memory module in response to receiving the read command;
    a write pointer that generates a write count according to the data strobe signal, the write count being associated with a position of the stored data in the FIFO buffer;
    a read pointer that maintains a read count according to a number of times that data in the FIFO buffer is read, the read count being associated with a position of the read data in the FIFO buffer; and
    a pointer calibration unit that sets the write count to be same as the read count after the read command is generated and before the memory module outputs the data.

2. The memory controller as recited in claim 1, wherein the memory module is a double-data-rate (DDR) memory module.

3. The memory controller as recited in claim 1, wherein the read pointer increments the read count by one every time the data in the FIFO buffer is read.

4. The memory controller as recited in claim 1, wherein the FIFO buffer is a ring buffer, and the read pointer and the write pointer are counters.

5. The memory controller as recited in claim 1, wherein the pointer calibration unit compares the read count and the write count, and updates the read count of the read pointer to the write count of the write counter when the read count and the write count are different.

6. A method for controlling a memory controller, the memory controller coupled to a memory module, the method comprising:
    providing information of a latency of the memory module;
    generating a read command that is provided to the memory module;
    storing data received from the memory module into a first-in-first-out (FIFO) buffer of the memory controller; and
    setting a write count to be same as a read count during the latency of the memory module when the read command is generated, the write count being associated with a position of written data in the FIFO buffer, the read count being associated with a position of read data in the FIFO buffer.

7. The method as recited in claim 6, wherein the memory module is a double-data-rate (DDR) memory module.

8. The method as recited in claim 6, wherein the latency of the memory module is associated with a column address strobe signal (CAS) latency.

9. The method as recited in claim 6, further comprising:
    updating the write count according to a data strobe signal of the memory module.

10. The method as recited in claim 6, further comprising:
    updating the read count according to a number of times that the data in the FIFO buffer is read.

11. The method as recited in claim 6, wherein the FIFO buffer is a ring buffer.

12. A method for controlling a memory controller, the memory controller coupled to a memory module, the method comprising:
    providing information of a latency of the memory module;
    determining whether a read command is generated by a command generator of the memory controller;
    comparing a read count with a write count when the read command is generated, the write count being associated with a position of written data in a first-in-first-out (FIFO) buffer of the memory controller, the read count being associated with a position of read data in the FIFO buffer; and
    setting the write count to be same as the read count during the latency when the write count differs from the read count.

13. The method as recited in claim 12, wherein the memory module is a double-data-rate (DDR) memory module.

14. The method as recited in claim 12, further comprising:
    updating the write count according to a data strobe signal of the memory module.

15. The method as recited in claim 12, further comprising:
    updating the read count according to a number of times that data in the FIFO buffer is read.

16. The method as recited in claim 12, wherein the FIFO buffer is a ring buffer.

* * * * *